United States Patent
Andrews et al.

(10) Patent No.: US 11,860,090 B2
(45) Date of Patent: Jan. 2, 2024

(54) LIGHT SOURCE INTENSITY CONTROL SYSTEMS AND METHODS FOR IMPROVED LIGHT SCATTERING POLARIMETRY MEASUREMENTS

(71) Applicant: CORNING INCORPORATED, Corning, NY (US)

(72) Inventors: Ryan Claude Andrews, Elmira, NY (US); Pierre Michel Bouzi, Horseheads, NY (US); William John Furnas, Elmira, NY (US); Jacob Immerman, Corning, NY (US); Jeremiah Robert Jacobson, Corning, NY (US); Katherine Anne Lindberg, Corning, NY (US); Evan Lewis Olson, Elmira, NY (US); Nathaniel David Wetmore, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 147 days.

(21) Appl. No.: 17/709,792

(22) Filed: Mar. 31, 2022

(65) Prior Publication Data
US 2022/0317041 A1 Oct. 6, 2022

Related U.S. Application Data

(60) Provisional application No. 63/169,466, filed on Apr. 1, 2021.

(51) Int. Cl.
*G01N 21/47* (2006.01)
*G01J 4/00* (2006.01)
*G01J 4/04* (2006.01)

(52) U.S. Cl.
CPC ........... *G01N 21/47* (2013.01); *G01J 4/00* (2013.01); *G01J 4/04* (2013.01); *G01N 2021/4735* (2013.01); *G01N 2021/4792* (2013.01)

(58) Field of Classification Search
CPC ...... G01J 4/02; G01J 3/447; G01J 4/00; G01J 4/04; G01N 2021/4792; G01N 21/21;
(Continued)

(56) References Cited

U.S. PATENT DOCUMENTS

| | | |
|---|---|---|
| 4,530,600 A | 7/1985 | Lopez |
| 5,703,713 A | 12/1997 | Leong et al. |

(Continued)

FOREIGN PATENT DOCUMENTS

| | | |
|---|---|---|
| CN | 103644990 A | 3/2014 |
| CN | 103697830 A | 4/2014 |

(Continued)

OTHER PUBLICATIONS

"Free-space optical isolators", Retreived on Oct. 14, 2022, https://www.edmundoptics.com/f/free-space-optical-isolators/33067/.
(Continued)

*Primary Examiner* — Michael P Stafira
(74) *Attorney, Agent, or Firm* — Timothy Schaeberle

(57) ABSTRACT

Systems and methods of performing a stress measurement of a chemically strengthened glass using a light-scattering polarimetry system include adjusting the intensity of a light beam from a light source in an illumination system using a rotatable half-wave plate and a first polarizer operably disposed between the light source and a rotating light diffuser that has a rotation time $t_R$. The first polarizer is aligned with a second polarizer in a downstream optical compensator to have matching polarization directions by rotating the rotatable half-wave plate to a position where the (Continued)

exposure time $t_E$ falls within an exposure range $t_R \le t_E$. The method also includes performing an exposure using the exposure time $t_E$ to obtain the stress measurement. One or both of the half-wave plate and first polarizer can be tilted to avoid deleterious back-reflected light from entering the light source.

20 Claims, 11 Drawing Sheets

(58) Field of Classification Search
CPC ........... G01N 21/47; G01N 2021/1789; G01N 2021/1795; G01N 2021/4166; G01N 2021/479; G01N 21/41; G01N 21/453; G01N 21/95607; G01N 2021/4735; G01N 2021/8822; G01N 21/9501; G01N 21/956; G01N 21/95623; G01N 21/958; G01N 2201/062; G01N 2021/8883; G01N 21/4788; G01N 21/8851; G01N 21/95684; G01N 2201/06113; G01N 2021/151; G01N 2021/4153; G01N 2021/4764; G01N 2021/4776; G01N 2021/95615; G01N 21/33; G01N 21/3581; G01N 21/4133; G01N 21/43; G01N 21/4738; G01N 21/474; G01N 21/55; G01N 21/552; G01N 2201/0633; G01N 2201/0636; G01N 2201/0638; G01N 2201/064; G01N 2201/1035

See application file for complete search history.

(56) References Cited

U.S. PATENT DOCUMENTS

| | | | |
|---|---|---|---|
| 7,327,518 B2 | 2/2008 | Hodgson et al. | |
| 7,715,084 B2 | 5/2010 | Tan et al. | |
| 8,165,838 B2 | 4/2012 | Kane et al. | |
| 8,264,675 B1 * | 9/2012 | Danyluk | G01B 11/168 356/366 |
| 9,534,981 B2 | 1/2017 | Roussev et al. | |
| 9,897,574 B2 | 2/2018 | Andrews et al. | |
| 10,180,416 B2 | 1/2019 | Roussev et al. | |
| 10,574,911 B2 | 2/2020 | Dvir | |
| 10,732,059 B2 | 8/2020 | Andrews et al. | |
| 10,900,850 B2 | 1/2021 | Andrews et al. | |
| 2007/0053397 A1 | 3/2007 | Burckel et al. | |
| 2012/0152918 A1 | 6/2012 | Li et al. | |
| 2012/0288231 A1 | 11/2012 | Zheng et al. | |
| 2016/0356760 A1 | 12/2016 | Roussev et al. | |
| 2019/0033144 A1 | 1/2019 | Andrews et al. | |
| 2019/0301952 A1 | 10/2019 | Andrews et al. | |
| 2020/0132548 A1 * | 4/2020 | Furnas | G01N 21/47 |
| 2020/0300615 A1 * | 9/2020 | Andrews | G01L 1/241 |

FOREIGN PATENT DOCUMENTS

| | | | |
|---|---|---|---|
| CN | 203519218 U | 4/2014 | |
| CN | 203519219 U | 4/2014 | |
| CN | 104280171 A | 1/2015 | |
| CN | 104296903 A | 1/2015 | |
| CN | 104296904 A | 1/2015 | |
| CN | 104316232 A | 1/2015 | |
| CN | 104316233 A | 1/2015 | |
| CN | 204128721 U | 1/2015 | |
| CN | 104330359 A | 2/2015 | |
| CN | 104330360 A | 2/2015 | |
| CN | 104359924 A | 2/2015 | |
| CN | 104458016 A | 3/2015 | |
| CN | 104596687 A | 5/2015 | |
| CN | 204479219 U | 7/2015 | |
| CN | 105181194 A | 12/2015 | |
| CN | 105203240 A | 12/2015 | |
| CN | 205027468 U | 2/2016 | |
| CN | 205049269 U | 2/2016 | |
| CN | 105424242 A | 3/2016 | |
| CN | 205066980 U | 3/2016 | |
| CN | 205120284 U | 3/2016 | |
| CN | 205120285 U | 3/2016 | |
| CN | 105466613 A | 4/2016 | |
| CN | 105547543 A | 5/2016 | |
| CN | 106770056 A | 5/2017 | |
| CN | 107144231 A | 9/2017 | |
| CN | 206573478 U | 10/2017 | |
| CN | 206583407 U | 10/2017 | |
| CN | 206583556 U | 10/2017 | |
| CN | 110441309 A * | 11/2019 | ............. G01N 21/21 |
| DE | 19720330 C1 | 11/1998 | |
| JP | H10125585 A * | 10/1996 | |
| JP | 10-153500 A | 6/1998 | |
| JP | 11-281501 A | 10/1999 | |
| JP | 2016-142600 A | 8/2016 | |
| JP | 6419595 B2 | 11/2018 | |
| JP | 2020153990 A * | 9/2020 | ........... G01B 11/168 |
| MX | 2017016357 A | 12/2018 | |
| TW | 201814273 A | 4/2018 | |
| WO | 2002/103310 | 12/2002 | |
| WO | WO-2010123074 A1 * | 10/2010 | ....... G01N 21/95607 |
| WO | 2017/115811 A1 | 7/2017 | |
| WO | 2019/054958 A3 | 6/2019 | |
| WO | 2019/163989 A1 | 8/2019 | |
| WO | WO-2021003802 A1 * | 1/2021 | ............. G01N 21/21 |

OTHER PUBLICATIONS

"IR Fiber Optic Isolators with SM Fiber (1290-2010 nm)", Retreived on Oct. 14, 2022, https://www.thorlabs.com/newgrouppage9.cfm?objectgroup_id=6178.

"Laser Backreflection—The bane of good performance", Retreived on Oct. 14, 2022, https://www.idc-online.com/technical_references/pdfs/instrumentation/Laser_Backreflection.pdf.

What are APC (angled physical contact) fiber connectors?, Retreived on Oct. 14, 2022, https://www.fiberoptics4sale.com/blogs/archive-posts/95041478-what-are-apc-angled-physical-contact-fiber-connectors.

Britzger, et al., "External-cavity diode laser in second-order Littrow configuration", Opt. Lett., vol. 37 No. 15, 2012, pp. 3117-3119.

Hempel, et al., "The impact of external optical feedback on the degradation behavior of high-power diode lasers", Proc. SPIE, 8605, 86050L, 2013.

Repasky, et al., "Extending the continuous tuning range of an external-cavity diode laser", Applied Optics, vol. 45 No. 35, 2006, pp. 9013-9020.

Takiguchi, et al., "Effect of the threshold reduction on a catastropic optical mirror damage in broad-area semiconductor lasers with optical feedback", Proc. SPIE 6104, 61040X, 2006.

Zheng, et al., "Effective bandwidth reduction for a high-power laser-diode array by an external cavity technique," Opt. Lett., vol. 30 No. 18, 2005, pp. 2424-2426.

Zhu, et al., "Active bandwidth control of external-cavity system for improving mode-hop-free sychronous tuning characteristics of an external-cavity diode laser", Optics and Laser Technology, vol. 129, 106272, 2020.

Basic Polarization Techniques and Devices, Meadowlark Optics, Inc, 2003.

International Search Report and Written Opinion of the International Searching Authority; PCT/US2020/061921; dated Mar. 15, 2021, 12 pages; European Patent Office.

International Search Report and Written Opinion of the International Searching Authority; PCT/US2022/022719; dated Sep. 1, 2022, 10 pages; European Patent Office.

Laser Backreflection—The Bane of Good Performance.

U.S. Appl. No. 63/152,021, "Enhanced Hybrid Systems and Methods for Characterizing Stress in Chemically Strengthened Transparent Substrates", filed Feb. 22, 2021.

(56) References Cited

OTHER PUBLICATIONS

What Are APC (Angled Physical Contact) Fiber Connectors?, Fosco Connect, Jan. 2014.

* cited by examiner

LIGHT SOURCE INTENSITY CONTROL SYSTEMS AND METHODS FOR IMPROVED LIGHT SCATTERING POLARIMETRY MEASUREMENTS

This application claims the benefit of priority of U.S. Provisional Application Ser. No. 63/169,466 filed on Apr. 1, 2021 the content of which is relied upon and incorporated herein by reference in its entirety.

The present disclosure relates to light scattering polarimetry systems used to measure stress in glass, and in particular relates to systems and methods for controlling the intensity of the light source in a light scattering polarimetry system to achieve improved stress measurements over a range of different types of chemically strengthened glasses.

BACKGROUND

Chemically strengthened (CS) glass is formed by subjecting the glass to a chemical modification to improve at least one strength-related characteristic, such as hardness, resistance to fracture, etc. CS glass has found particular use as cover glasses for display-based electronic devices, especially hand-held devices such as smart phones and tablets. One form of chemical strengthening involved exchanging ions in the glass with external ions, and this process is referred in the art as ion exchange or IOX for short.

The chemical strengthening process introduces stress into the CS glass. The stress results in the CS glass having enhanced strength-related properties, such as increased hardness and greater resistance to fracture. Consequently, an important aspect of manufacturing CS glass is to characterize the stress in the CS glass to ensure an optimal or select amount of stress is being introduced into the CS glass so that the CS glass has optimal or select strength-related properties.

One type of glass stress measurement method is called light scattering polarimetry or LSP for short. In a LSP system, the CS glass is irradiated with input laser light at a relatively shallow angle through a coupling prism. The laser light polarization is varied continuously between different polarization states using an optical compensator. The scattered light is detected by an image sensor. Stress in the CS glass causes optical retardation along the light path, with the amount of stress being proportional to the derivative of the optical retardation. The amount of optical retardation can be determined from the stress-induced phase shifts in the detected scattered light intensity distribution at each depth along the beam path. The LSP method is useful for measuring certain stress-related properties, such as the central tension (CT) and depth of compression (DOC). An example of an LSP system combined with an evanescent prism coupling spectroscopy (EPCS) system to form a hybrid glass stress measurement system as disclosed in U.S. Patent Application No. 63/152,021, filed on Feb. 22, 2021 and which is incorporated by reference herein. The hybrid system has the advantage that it enables two different types of stress measurements that are complementary, resulting in a more complete and accurate characterization of the stress properties of CS glass (e.g., surface stress, near-surface compressive stress profile, knee stress, depth of layer, central tension, depth of compression, etc.).

LSP systems are used to measure different CS glass types that have different amounts of light scattering. Problems arise when the light source intensity cannot be controlled to provide an optimum amount of light for measuring the stress of the given CS glass type when there is a single light sensor having a fixed integration time. This results in inconsistent stress measurement and stress characterization accuracy of different types of CS glass types.

SUMMARY

An embodiment of the disclosure is directed to a method of performing a stress measurement of a chemically strengthened glass using an LSP system having a light source system that emits a light beam, an optical compensator and a digital detector with an integration time $t_I$, comprising: a) adjusting the intensity of a light beam using a rotatable half-wave plate and a first polarizer operably disposed between the light source and a rotating light diffuser that has a rotation time $t_R$ by aligning the first polarizer with a second polarizer in the optical compensator to have matching polarization directions by rotating the rotatable half-wave plate to a position where the exposure time $t_E$ falls within an exposure range $t_R \leq t_E$; an b) performing an exposure using the exposure time $t_E$ to obtain the stress measurement.

Another embodiment of the disclosure comprises the above method, wherein the chemically strengthened glass comprises a first chemically strengthened substrate having a first amount of light scattering and further comprising: replacing the first chemically strengthened substrate in the LSP system with a second chemically strengthened substrate having a second amount of light scattering that is different from the first amount of light scattering by at least a factor of 2×; and repeating acts a) and b) of the method for the second chemically strengthened substrate.

Another embodiment of the disclosure comprises any of the above methods, wherein said adjusting comprises measuring a contrast of an intensity distribution of an LSP image captured by the digital detector.

Another embodiment of the disclosure comprises any of the above methods, wherein the exposure time $t_E$ is between 5 ms and 10 ms.

Another embodiment of the disclosure comprises any of the above methods, wherein the light source system comprises an axis along which the light beam travels, wherein the rotatable half-wave plate and the polarizer form back-reflected light from the light beam, and further comprising operably tilting at least one of the rotatable half-wave plate and first polarizer relative to the axis to avoid directing the back-reflected light to the light source.

Another embodiment of the disclosure comprises any of the above methods, wherein the back-reflected light is directed to one or more light absorbers.

Another embodiment of the disclosure comprises any of the above methods, wherein the rotatable half-wave plate has a tilt angle $\theta_{WP}$ in the range $10° \leq \theta_{WP} \leq 20°$ relative to the axis.

Another embodiment of the disclosure comprises any of the above methods, wherein the polarizer has a tilt angle $\theta_P$ in the range $5° \leq \theta_P \leq 10°$ relative to the axis.

Another embodiment of the disclosure comprises any of the above methods, wherein the light source comprises a laser diode having an optical power in the range from between 20 and 300 milliwatts.

Another embodiment of the disclosure comprises any of the above methods, wherein the rotating light diffuser comprises a holographic light diffuser.

Another embodiment of the disclosure comprises any of the above methods, wherein the second polarizer comprises a polarizing beam splitter.

Another embodiment of the disclosure comprises any of the above methods, further comprising rotating the rotatable half-wave plate with a motorized mount that operably supports the rotatable half-wave plate.

Another embodiment of the disclosure comprises the above method, wherein the rotating the rotatable half-wave plate is conducted with a controller configured to automatically operate the motorized mount Another embodiment of the disclosure comprises any of the above methods, wherein the half-wave plate comprises a polymer material.

Another embodiment of the disclosure comprises any of the above methods, and further comprising: forming a digital LSP image of the chemically strengthened glass on a digital detector having a saturation limit and comprising pixels having corresponding pixel intensities as defined by the digital LSP image; and wherein said adjusting of the intensity of the light beam comprises limiting the pixel intensities to be between 25% and 75% of the saturation limit.

Another embodiment of the disclosure is directed to an illumination system for providing light intensity control for an LSP system for measuring stress in a chemically strengthened glass and in optical communication with an compensator and a digital detector with an integration time $t_I$. The illumination system comprises in order along an axis: a light source that emits a light beam along the axis at a first intensity; a rotatable half-wave plate; a first polarizer having first polarization direction aligned with a second polarization direction of a second polarizer in the optical compensator; a rotatable light diffuser that has a rotation time of $t_R$; and wherein the rotatable half-wave plate is set at a rotation angle such that the light beam exiting the first polarizer and incident upon the rotatable light diffuser has a second intensity less than the first intensity that causes the LSP system to have an exposure time $t_E$ for the CS glass that falls within an exposure range $t_R \le t_E$ for measuring the stress in the CS glass.

An illumination system according to the above-described illumination system, wherein the rotatable half-wave plate and the polarizer form back-reflected light and wherein at least one of the rotatable half-wave plate and the polarizer is/are operably tilted relative to the axis to direct the back-reflected light to the light source.

An illumination system according to any of the above-described illumination systems, wherein the rotatable half-wave plate has a tilt angle $\theta_{WP}$ in the range $10° \le \theta_{WP} \le 20°$ relative to the axis.

An illumination system according to any of the above-described illumination systems, wherein the polarizer has a tilt angle $\theta_P$ in the range $5° \le \theta_P \le 10°$ relative to the axis.

An illumination system according to the above-described illumination system, wherein the back-reflected light is directed to one or more light absorbers.

An illumination system according to any of the above-described illumination systems, wherein the exposure time $t_E$ is between 5 ms and 10 ms.

An illumination system according to any of the above-described illumination systems, wherein the light source comprises a laser diode having an optical power in the range from between 20 and 300 milliwatts.

An illumination system according to any of the above-described illumination systems, wherein the light diffuser comprises a holographic light diffuser.

An illumination system according to any of the above-described illumination systems, wherein the second polarizer comprises a polarizing beam splitter.

An illumination system according to any of the above-described illumination systems, further comprising a rotatable motor mount that rotatably supports the rotatable half-wave plate.

An illumination system according to the above-described illumination system, further comprising a controller configured to automatically operate the rotatable motor mount.

An illumination system according to any of the above-described illumination systems, wherein the half-wave plate comprises a polymer material.

An illumination system according to any of the above-described illumination systems, further comprising the optical compensator.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary and are intended to provide an overview or framework to understand the nature and character of the claims.

BRIEF DESCRIPTION OF THE DRAWINGS

The accompanying drawings are included to provide further understanding. They are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures, in which.

DETAILED DESCRIPTION

Figure 1:
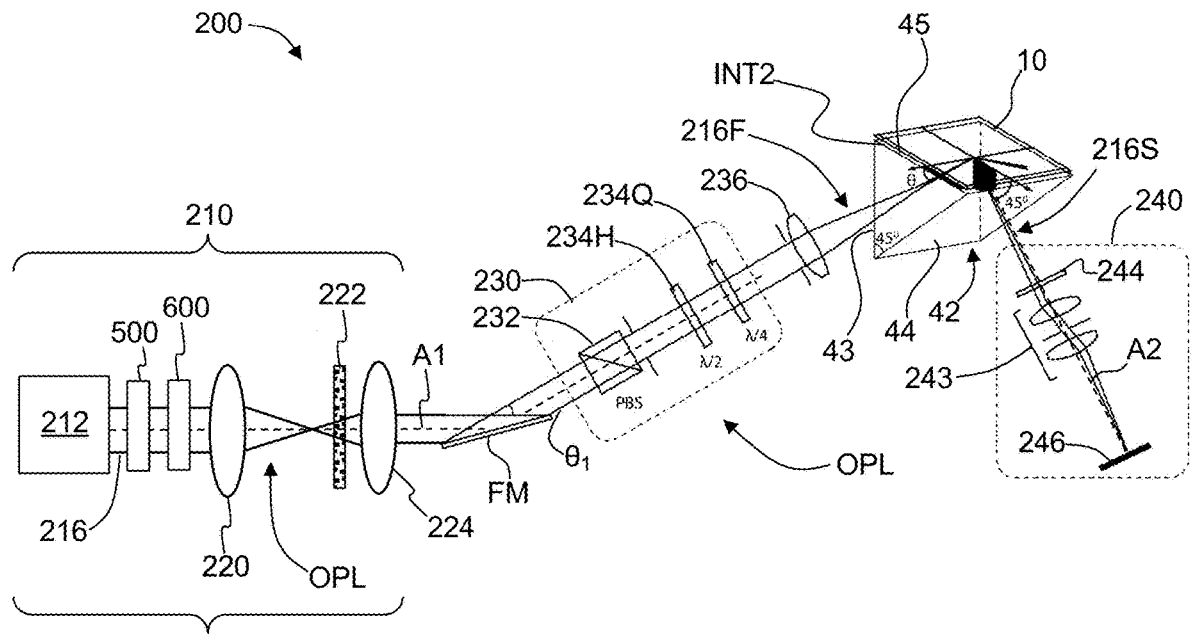
FIG. 1 is a schematic diagram of an example LSP system with a light source system that includes a rotating half-wave plate and a polarizer upstream of the diffuser and operably disposed between the laser light source and the first focusing lens.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

Cartesian coordinates are used in some Figures for the sake of reference and are not intended to be limiting as to direction and/or orientation.

The abbreviation μm stands for micron or micrometer, which is $10^{-6}$ meter.

The abbreviation nm stands for nanometer, which is $10^{-9}$ meter.

The term "glass" used herein includes ordinary glass, glass crystal or a glass ceramic. Likewise, the term "glass substrate" can include a glass article, a glass part, a glass component, etc. In some cases, the term "glass ceramic" is used expressly to indicate a glass ceramic substrate, article, etc.

The abbreviation CS stands for "chemically strengthened" unless otherwise noted.

The terms "upstream" and "downstream" refer to locations relative to the direction of light travel, wherein "A is upstream of B" means that the light is incident first upon A and then upon B, and wherein "A is downstream of B" means that the light is first incident upon B and then A.

The term "lens" as used herein can mean a collection of optical components or a single optical component. Likewise, an optical component can be refractive, reflective, diffractive, etc. unless specifically stated otherwise.

The "optical path" of an optical system refers to a route taken by light through the optical system from one location to another and is considered an intrinsic property of the optical system as defined by its constituent elements, i.e., it exists even when there is no light traveling through the optical system.

The term "contrast" as used below with respect to an intensity distribution can be expressed as $C=[I_{MAX}-I_{MIN}]/[I_{MAX}+I_{MIN}]$ where $I_{MAX}$ and $I_{MIN}$ are the maximum and minimum values in the intensity distribution.

In the discussion below, the term "tilted" as used in connection with the rotatable half-wave plate 500 and the polarizer 600 means operably tilted, i.e., tilted in a manner that reduces or eliminates back reflections from reaching the output end face of the light source 212, as discussed below.

The rotation time $t_R$ as used below with respect to a rotating light diffuser is the time it takes for the light diffuser to make one complete rotation.

The LSP system described herein can also be referred to as a light-scattering polarimeter.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

The LSP System

Figure 3:
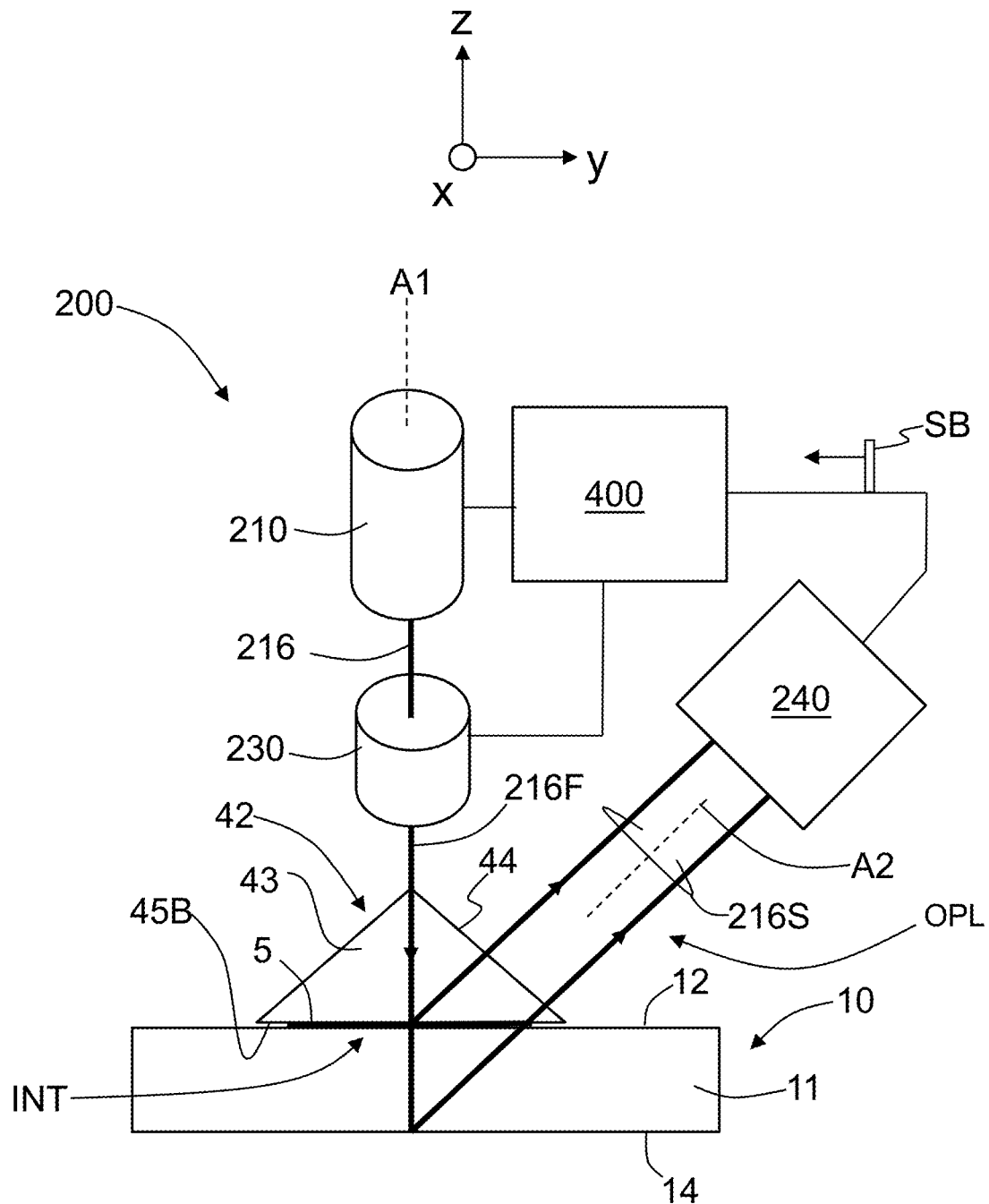
FIG. 3 and FIG. 4 are additional schematic diagrams of the example LSP system of FIG. 1 from different viewing orientations.
Figure 4:
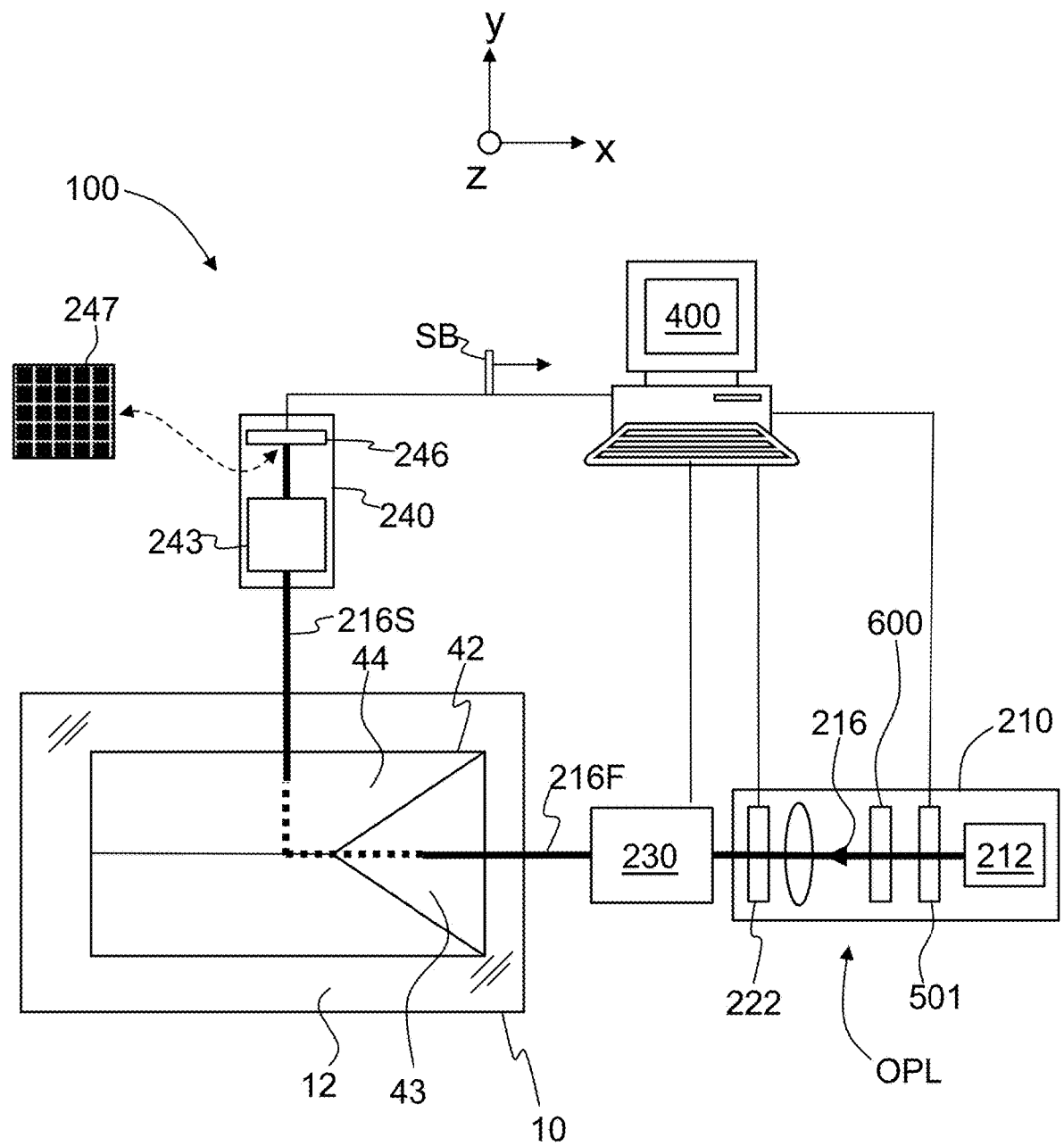

FIG. 1 is a schematic diagram of an example LSP system 200 that includes a light source system 210 according to the disclosure. FIG. 3 and FIG. 4 are additional schematic diagrams of the example LSP system 200 of FIG. 1 from different viewing orientations. The LSP system 200 includes system axes A1 and A2, which can be referred to as first and second axes or just axis A1 and axis A2, respectively.

The light source system 210 includes a light source 212 that emits light (or a light beam) 216 that travels over an optical path OPL. In an example, the light source 212 consists of or comprises a laser. In an example, the light source 212 comprises a laser diode that further in an example operates at λ=405 nm. An example laser diode can generate optical power in the range from 20 mW to 300 mW. The wavelength λ can be referred to as the LSP wavelength. The light source system 210 is described in greater detail below.

The LSP system 200 also includes an optical compensator 230 residing in the optical path OPL and along the (folded) axis A1 downstream of the light source system 210. The optical compensator 230 includes a polarizer 232, which can be in the form of a polarizing beam splitter PBS. The polarizer 232 has a polarizing direction. The optical compensator 230 also includes a half-wave plate 234H and a quarter-wave plate 234Q with one of the wave plates being rotatable relative to the other to change the state of polarization of the light beam 216. In an example, the optical compensator 230 can comprise an electronically controlled polarization modulator, such as a liquid-crystal-based modulator or a ferroelectric liquid-crystal-based modulator or like modulator, which would constitute or otherwise comprise the "polarizer" in the optical compensator 230.

In an example, the optical compensator 230 is operably connected to a controller 400 (see FIGS. 3 and 4) that controls the polarization switching operation performed by the optical compensator. In an example, the optical compensator 230 can comprise a single liquid crystal device. In another example, the optical compensator 230 can comprise multiple elements such as polarizers, wave plates, filters, prisms (e.g., wedge prisms), etc. In an example, the optical compensator 230 causes the light beam 216 to go through a full polarization cycle (i.e., change between two or more select polarizations) in anywhere from less than 1 second to 10 seconds. In an example, the optical compensator 230 can be operably connected to and controlled by a system controller 400. A focusing lens 236 resides in the optical path OPL downstream of the optical compensator 230 and is used to form a focused light beam 216F. The optical compensator 230 and focusing lens 236 constitute a light modulation system.

The LSP system 200 includes an LSP coupling prism 42 that resides downstream of the focusing lens 236. The LSP coupling prism has respective input and output surfaces 43 and 44 and a bottom or "coupling" surface 45. The coupling surface 45 and a top surface 12 of a CS glass substrate 10 defines a (LSP) coupling interface INT. In an example, the coupling interface INT includes an index matching fluid 5 (see FIG. 3). The CS glass substrate 10 has a body 11 and a bottom surface 14 opposite the top surface 12.

A detector system 240 resides downstream of the LSP coupling prism and along the optical path OPL on a (second) axis A2 that is orthogonal to the (first) axis A1, i.e., the axis A2 resides in the Y-Z plane. In an example, the detector system 240 includes a collection optical system 243 and a digital detector (e.g., a CCD camera) 246. In an example, the collection optical system 243 is telecentric and has unit magnification. The detector system 240 can also include a bandpass filter 244 centered on the LSP wavelength λ. In an example best seen in FIG. 4, the digital detector 246 comprises array of imaging pixels 247, which in an example can have a dimension of between 1.8 microns and 10 microns. The digital detector 246 is subject to sensor saturation if the exposure time is not set proportional to the intensity of signals received, as discussed below.

Figure 5:
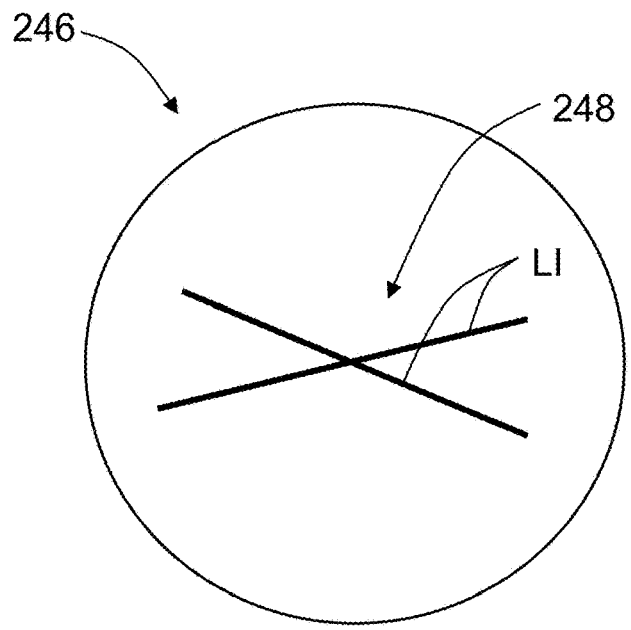
FIG. 5 is a schematic diagram of the characteristic X-shaped LSP image as formed on the digital detector of the LSP system.

In the general operation of the LSP system 200, the focused light beam 216F formed by the focusing lens 236 is incident upon the input surface 43 of the LSP coupling prism 42 and travels to the coupling surface 45 and then through the index-matching fluid 5 and to the top surface 12 of the CS substrate 10 to enter the body 11 of the CS substrate. The focused light beam 216F has a select polarization at any given time as defined by the optical compensator 230. The (polarized) input focused light beam 216F is scattered by particles in the body 11 of the CS substrate 10 to form a scattered light beam 216S. The scattered light beam 216S exits the top surface 12 of the CS substrate, passes back through the coupling interface INT and then exits the coupling prism 42 at the output surface 44. The scattered light beam 216S travels to the detector system 240 and is directed to the digital detector 246 by the collection optical system 243. The scattered light beam 216S forms a LSP image 248 on the digital detector 246, as shown in the close-up view of FIG. 5. This defines a digital LSP image. The LSP image 248 is taken to be the digital LSP image unless otherwise noted. FIG. 5 is a schematic diagram of an example LSP image 248 that shows line images LI that form a characteristic "X" shape due to reflections of the scattered Light beam 216S from the different interfaces associated with the interface INT as defined by CS substrate 10, LSP coupling prism 42 and the index-matching fluid 5.

Stress in the CS glass substrate 10 causes optical retardation along the light path within the body 11 of the CS glass substrate, with the amount of stress being proportional to the derivative of the optical retardation. The amount of optical retardation can be determined from the stress-induced phase shifts in the detected scattered light intensity distribution (as the LSP image 248) at each depth along the beam path.

The Light Source System

Figure 2A:
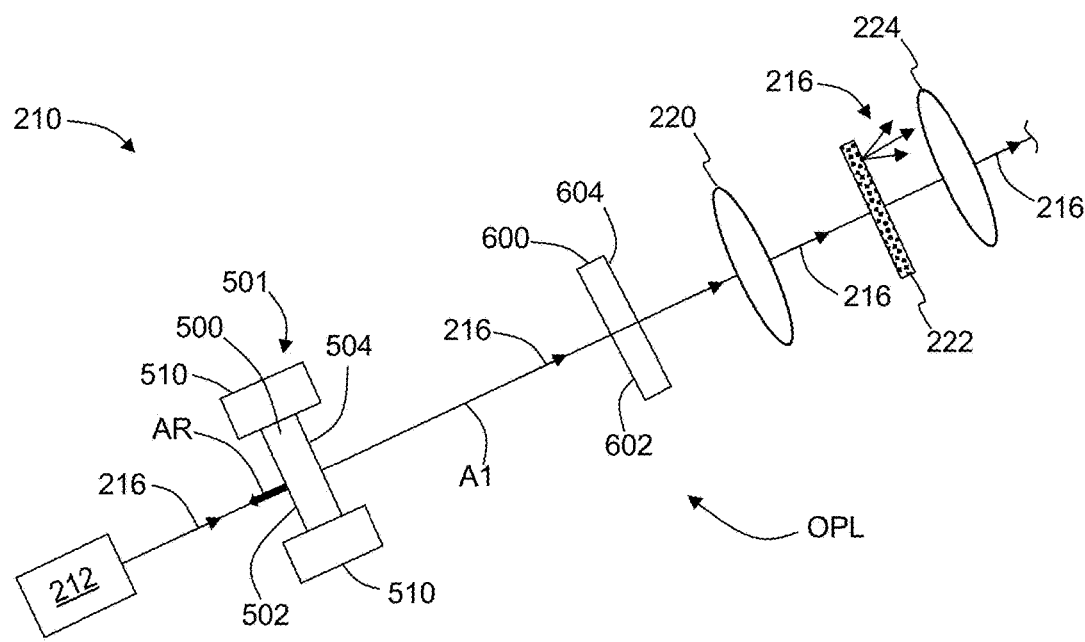
FIG. 2A is a close-up view of the light source system of the LSP system of FIG. 1.

FIG. 2A is a close-up view of the example light source system 210 of the LSP system of FIG. 1. With reference again to FIG. 1 and FIG. 2A, the light source system 210 includes along the axis A1 and downstream from the light source 212: a focusing lens 220, a movable light diffuser 222, and a collimating lens 224. The movable light diffuser 222 can comprise a holographic element configured to perform light diffusion at the LSP wavelength λ. In an example, the movable light diffuser 222 can comprise a rotating light diffuser or an oscillating light diffuser. One or more fold mirrors FM can optionally be used to fold the LSP system 200 to make it more compact.

Figure 2B:
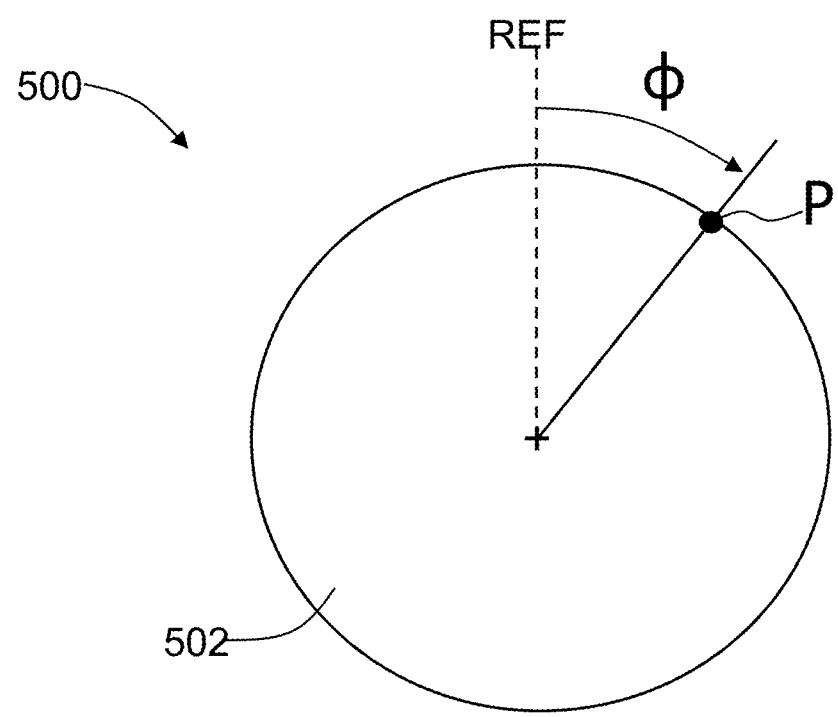
FIG. 2B is a front-on view of an example rotatable half-wave plate showing the measurement of the half-wave plate angle $\phi$ of the rotatable wave plate relative to a reference position in the light source system.

The light source system 210 also includes a rotatable half-wave plate 500 and a linear polarizer 600 operably arranged between the light source 212 and the focusing lens 220, with the rotatable half-wave plate residing upstream of the linear polarizer. The polarization direction of the polarizer 600 is set to match (i.e., is co-directional with) the polarization direction of the polarizer 232 (e.g., polarizing beam splitter PBS) in the optical compensator 230 or more generally the polarization of the optical compensator itself when using a polarization modulator. The rotatable half-wave plate 500 has a front surface 502 and back surface 504 while the polarizer 600 has a front surface 602 and a back surface 604. The rotatable half-wave plate 500 is operably supported by a motorized mount 510 configured to rotate the half-wave plate about a rotation axis AR, which in one example is parallel to the axis A1 and in another example discussed below is along a tilted direction defined by a tilt angle $\theta_{WP}$ measured relative to the axis A1. As best seen in the front-on view of FIG. 2B, the rotational position of the rotatable half-wave plate is defined by an azimuthal (rotation) angle $\phi$ (hereinafter, half-wave plate angle) as measured between a reference position REF in the LSP system and a position P on the half-wave plate. The half-wave plate 500 and the motorized mount constitute a half-wave plate assembly 501. In an example, the half-wave plate assembly 501 is operably connected to and controlled by the system controller 400, and the system controller 400 may be configured to automatically control the half-wave plate assembly 501. In an example, the system controller 400 is configured to adjust the half-wave plate assembly 501 in response to a digital image 248 intensity. In an example, the motorized mount 510 comprises a high-precision motor that can rotate the half-wave plate 500 in small angular increments, e.g., smaller than 1 degree.

The primary role of the light diffuser 222 is to reduce laser speckle generated by the sample under test (e.g., the CS glass substrate 10 or like CS glass article, etc.) when using a coherent light source 212. Speckle reduction is needed to maintain measurement accuracy and reliability. However, the light diffuser 222 has the adverse effect of reducing the light intensity, e.g., by 10-20%, depending on the diffusing angle, the amount of stress-induced birefringence in the material and the material transparency. This is usually not an issue for certain glass types such as glass ceramics, as just a few milliwatts of optical power can produce enough scattering intensity to have an exposure time $t_E$ substantially lower than what might be required for a non-glass-ceramic sample, such as a sample that does not include a crystalline phase. Unfortunately, the light diffuser 222 also acts to slightly reduce the polarization of the light 216 passing therethrough and this slight "depolarization" adversely affects the polarization contrast facilitated by the polarizer in the optical compensator 230.

It has been found that with a fixed light source intensity, the measurement accuracy of different CS glass types suffers because the light intensity that works well for one CS glass type having one amount of light scattering does not always work well for other CS glass types having another amount light scattering. For example, in some cases one CS glass type has an amount of light scattering in the LSP system that is at least 2× more than another glass type. The half-wave plate 500 and polarizer 600 are used as an efficient and quick way to control the intensity of the light 216 emitted by the light source 212 before the light is incident upon the light diffuser 222 based on the CS glass type being measured. This allows for complete reduction in the scattering intensity at the digital detector 246 at cross polarization for the given CS glass substrate 10 being measured and generally provides added flexibility to the LSP system 200 to measure any type of CS glass, especially when the light source 212 has relatively high power, such as laser diodes in the power range of 50-300 mW. Thus, in the operation of the light source system 210, the light source 212 itself has a fixed intensity, i.e., it is not controlled to provide different output intensities of the light beam 216.

Figure 6:
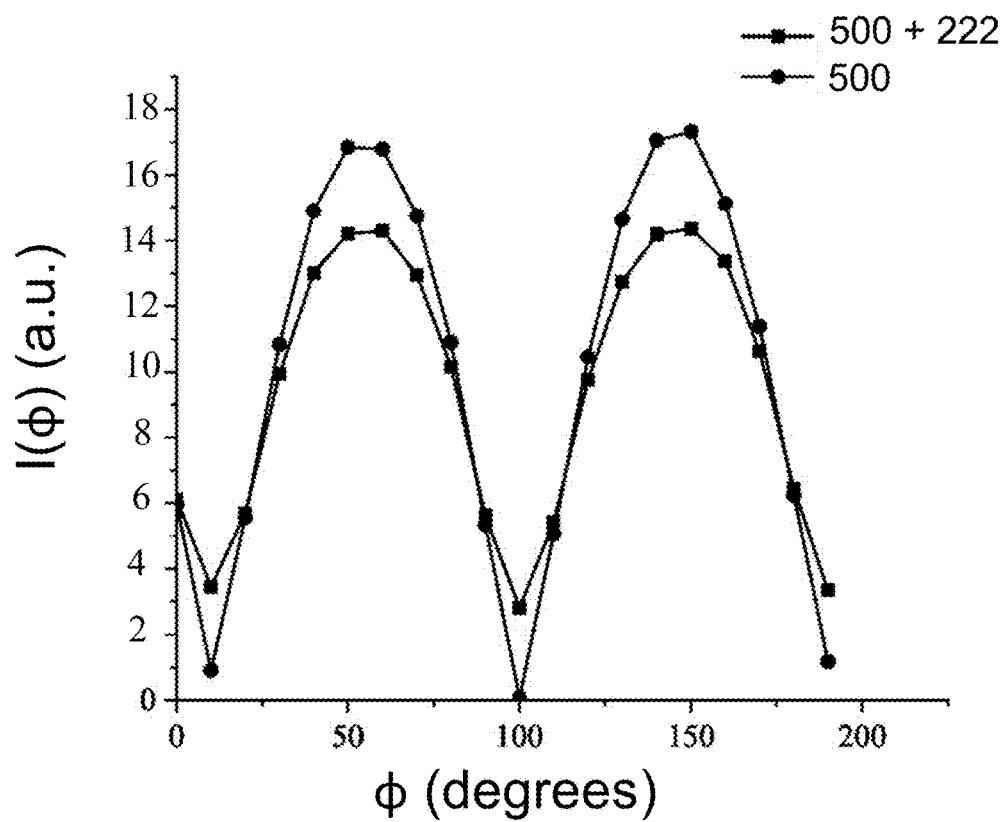
FIG. 6 is a plot of the integrated intensity $I(\phi)$ (arbitrary units, a.u.) of example LSP images versus the half-wave plate angle $\phi$ (degrees) of the half-wave plate (and with no polarizer in the light source system) for the case of no light diffuser (circles) and with a light diffuser (squares).

FIG. 6 is a plot of the integrated intensity I(φ) (arbitrary units, a.u.) of example LSP images 248 for a reference CS sample 10 versus the half-wave plate angle φ (degrees) of the half-wave plate 500 and without the polarizer 600 for the case of no light diffuser 222 (circles) and with a rotating light diffuser (squares). A 50-mW laser diode was used as the light source 212 and digital LSP images 248 were captured by the detector system 240 at various half-wave plate angles φ. The plot shows about a 1.7× drop in contrast when the rotating light diffuser 222 is present as compared to when the half-wave plate 500 is used alone.

Further experiments and simulations showed that a preferred configuration has the rotatable half-wave plate 500 residing upstream of the polarizer 600 to control the intensity of the light beam 216. In this configuration, the polarization orientation of the light source 212 does not influence the range of intensities generated by the optical compensator 230 so that the intensity of the light beam 216 exiting the light source system 210 can be set to optimize the focus spot size on the CS substrate 10 as seen by the digital detector 246. In addition, the light source system 210 disclosed herein can cycle through a full range of light intensities ($I_{max}$ to $I_{min}$) with 45 degrees of rotation of the rotatable half-wave plate 500.

Figures 7A, 7B:
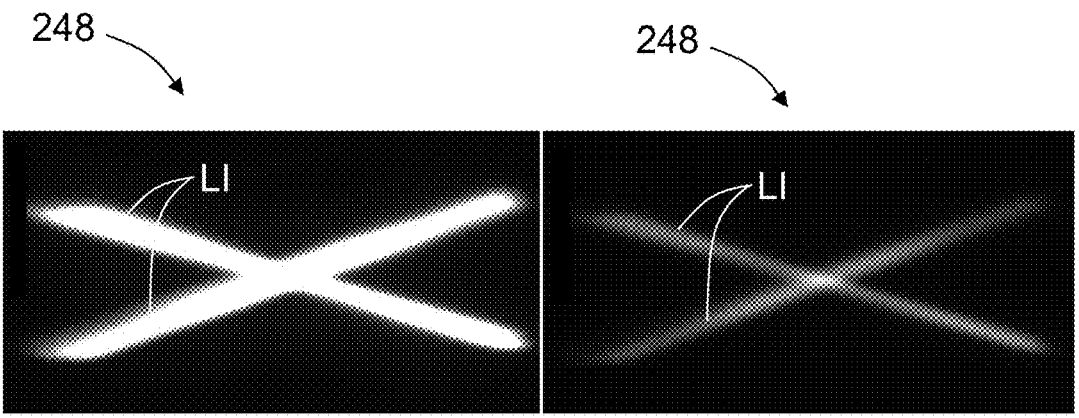
FIG. 7A and FIG. 7B are example LSP images for an example glass ceramic substrate obtained at two orientations of the half-wave plate at 45 degrees apart using an LSP system having the light source system as described above but without the polarizer.

FIG. 7A and FIG. 7B show LSP images 248 for an example CS glass ceramic substrate 10 obtained at two orientations of the half-wave plate 500 at 45 degrees apart using an LSP system 200 having the light source system 210 as described above but without the polarizer 600. The digital LSP images 248 were captured for an example glass ceramic CS substrate 10 using a 10 ms exposure using a 50-mW laser diode as the light source 212. The inability to obtain a completely dark image with the half-wave plate 500 alone as shown in FIG. 7B is a direct consequence of the depolarization from the light diffuser 222 and the intensity of the light 216 being too great for the CS glass substrate being measured.

Figures 8A, 8B:
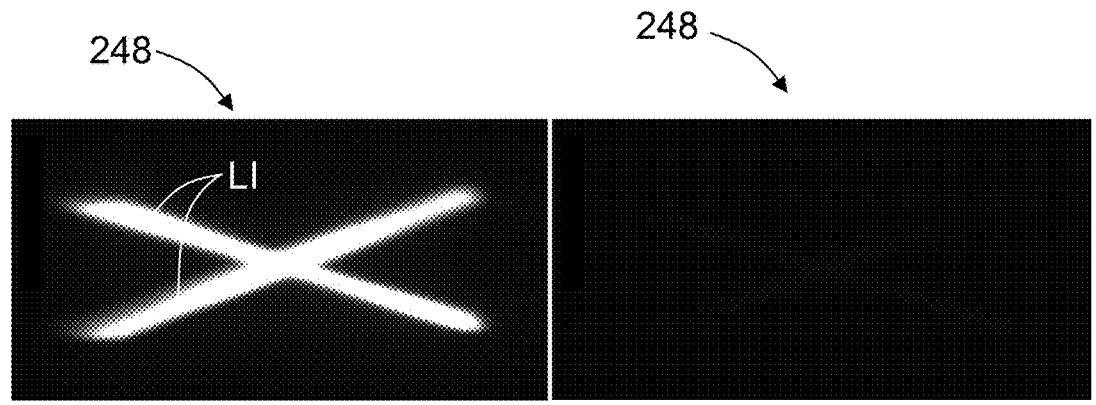
FIG. 8A and FIG. 8B are similar to FIG. 7A and FIG. 7B and are LSP images for an example glass ceramic substrate obtained at two orientations of the half-wave plate at 45 degrees apart using a light source system as described above that includes the half-wave plate and the polarizer.

FIG. 8A and FIG. 8B are LSP images 248 for the same CS glass ceramic substrate 10 as in FIGS. 7A and 7B and obtained at two orientations of the half-wave plate 500 at 45 degrees apart using a light source system 210 as described above that includes the half-wave plate 500 and the polarizer 600, with the polarizer having its polarization direction set to match the polarization direction of the polarizer 232 of the optical compensator 230. The half-wave plate angle φ was set to obtain an intensity of the light 216 that gave near complete intensity reduction in the digital image 248 as shown in FIG. 8B.

An aspect of controlling the intensity (or optical power) of the light 216 prior to reaching the light diffuser 222 is to provide substantially the same exposure time $t_E$ for each different type of CS glass substrate 10 measured. Defining the lower limit of exposure time $t_E$ is the elapsed time $t_R$ for one rotation (i.e. the rotation time) of the diffuser 222 as explained in detail below. Here, the light diffuser 222 must have moved (e.g., rotated, oscillated, vibrated, translated, etc.) enough to smooth out the intensity variations in the light beam 216 that passes through the light diffuser.

For example, consider measuring stress in a glass-ceramic CS substrate 10 using an exposure time $t_E$=10 ms. Because glass ceramics have relatively high light scattering, this exposure time would end up saturating the detector, so that a shorter exposure time $t_E$ (e.g., shorter than 1 ms) would be required for a 50 mW laser diode light source 212. But such a short exposure time $t_E$ may not allow for sufficient movement of the light diffuser 222 depending on the rotation time $t_R$. Intensity variations in the light beam 216 from the spatial variations in the light diffuser transmission may not smoothed out and thus adversely affect the accuracy of the stress measurement. This inaccuracy is caused by the imaging of the diffuser rotation itself, which causes random intensity variations throughout the measurement. In an example, the exposure time $t_E$ must exceed rotation time $t_R$ for 1 rotation of the light diffuser 222. In the $t_E$=10 ms example, for an example diffuser rotation of 10,000 rpm, one rotation will take about $t_R$=6.02 ms. In this case the theoretical minimum exposure $t_E$ is 6.02 ms, i.e., satisfying the condition $t_R$ $t_E$. Using $t_E$=10 ms, the diffuser will rotate 1.66 times per exposure.

Furthermore, the light diffuser 222 must be able to move at a sufficient speed to be able to substantially reduce speckle effects in the LSP image 248. Adjusting the intensity of the light beam 216 using the half-wave plate 500 and polarizer 600 to achieve an exposure time $t_E$ that is equal to or above the elapsed rotation time of the diffuser while also providing for good extinction (see FIG. 8B) allows for a wide range of CS glasses to be measured in the LSP system 200 with suitable light contrast and speckle control with minimal delay and effort between measurements of different CS glass types.

In theory there is no upper limit on the exposure time $t_E$ but in practice it needs to be sufficiently small avoid long measurement cycle time for the LSP system 200 since such systems are used in a manufacturing setting for process control of CS glass formation. For example, with $t_E$=10 ms, the total measurement cycle time is about 8 seconds.

In an example, a calibration step is performed to ensure that no pixels 247 in the digital detector 246 are saturated. This can be based on a conventional pixel brightness scale of 256 values, e.g., from 0 (darkest) up to 255 (brightest). In this example, the pixel intensity of 255 represents the saturation limit. It turns out that usually there is a small range of half-wave plate angles (positions) φ that avoid detector (pixel) saturation. In an example, a select range of the pixel intensity along the beam path is imposed. For example, a maximum pixel intensity cannot be more than 75% of the saturation limit of the digital detector 246 and the minimum pixel intensity cannot fall below 25% of the saturation limit. There will still be a small range of half-wave plate angles ϕ (i.e., positions) to choose from, but that does not affect the quality of the stress measurement results. This approach works particularly well for glass ceramics and like high-scattering glasses where the line images that make up the LSP image are spread out so that there is no visible "fireball" at the prism-sample interface. This is because the volumetric properties of the glass ceramic cause more scattering than the typical Fresnel reflection due to slight index mismatch at the interface.

Figure 8C:
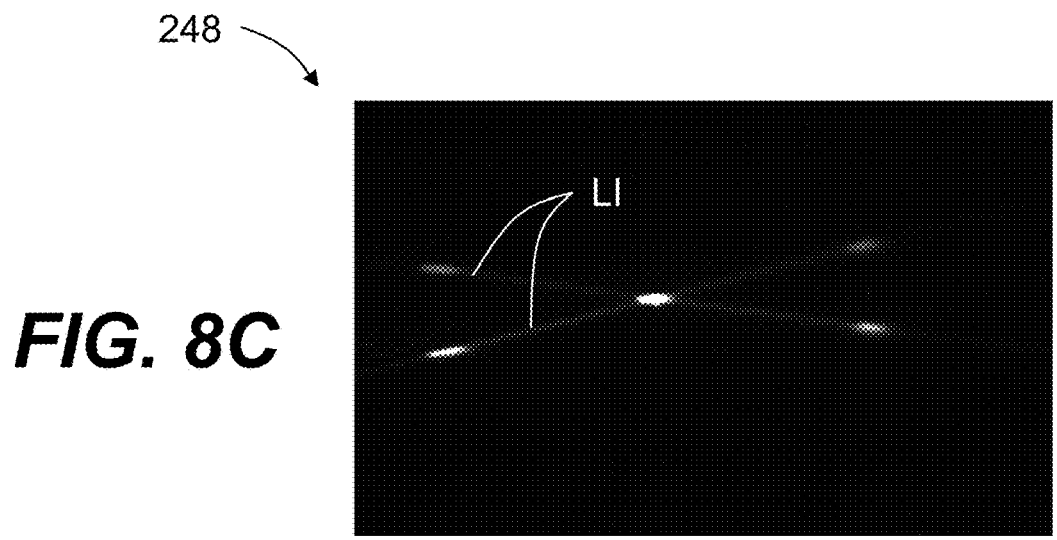
FIG. 8C is similar to FIG. 7A and FIG. 8A for an example CS substrate that does not have as much light scattering as a CS glass ceramic substrate and showing a central hot spot or "fireball" along with bright ends of the line images.

FIG. 8C is similar to FIG. 7A but shows an example LSP image 248 for a relatively low-scattering CS glass substrate 10 where now there is a hot spot (bright spot) or "fireball" at the center of the LSP image and the ends of the crossed line images LI are brightest. If we consider the lower left leg of the crossed LSP image to be the scattered light beam of interest, it can be said that there are two fireballs, one at the prism-glass interface and the other in the middle of the cross at the glass-air interface INT. In such a situation, the method looks to avoid pixel saturation along the beam path and also away from the "fireballs" or LSP image hot spots. In this case, the conditions for half-wave plate positions will be slightly different than those set for glass ceramics but the general method of setting the half-wave plate 500 and polarizer 600 still applies.

Mitigating Adverse Effects of Back Reflections into the Light Source

When the light beam 216 from the light source 212 reaches the half-wave plate 500 at normal incidence, a portion of the light beam gets reflected back towards the light source from both the front and back surfaces 502 and 504 of the half-wave plate. Likewise, a portion of the light beam 216 normally incident on the polarizer 600 gets reflected back towards the light source 212 from the front and back surfaces 602 and 604 of the polarizer. This back-reflected light can cause frequency and power fluctuations when the light source 212 comprises a laser since the half-wave plate 500 and polarizer 600 act as an external cavities for the laser, which causes some of the lasing modes to share the gain medium, resulting in a drop in optical power.

Figure 9:
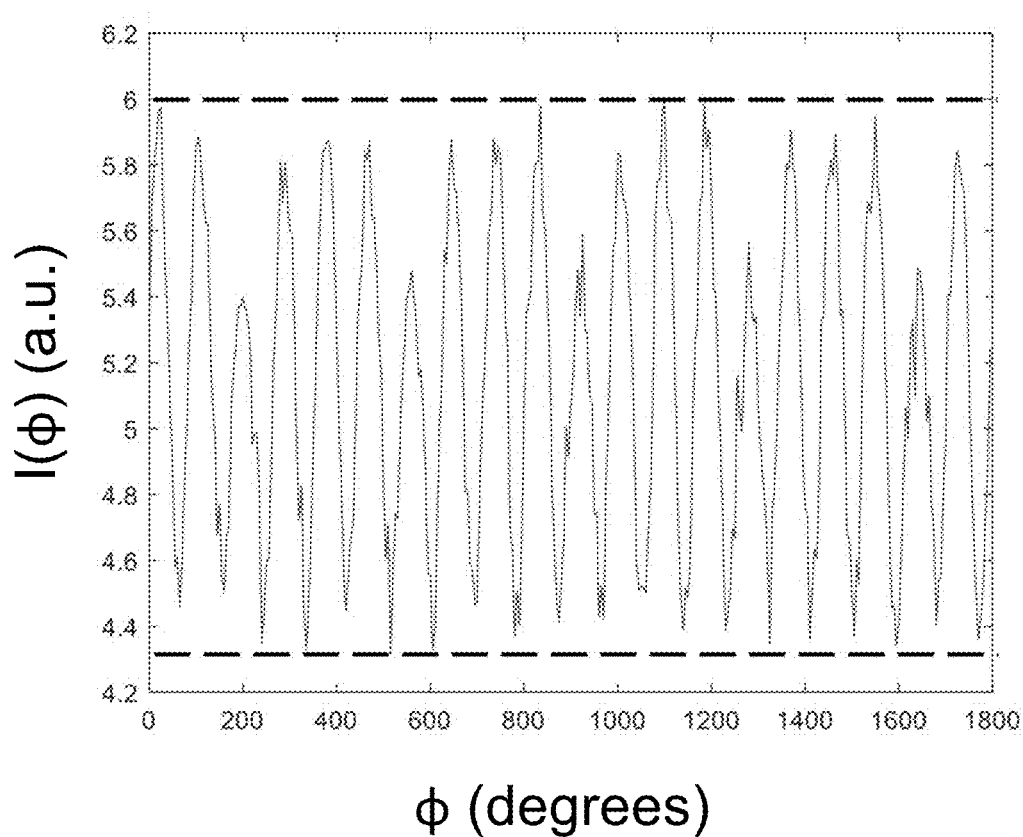
FIG. 9 is a plot of the integrated intensity I(φ) (arbitrary units, a.u.) based on example LSP images versus the half-wave plate angle φ (degrees) of the half-wave plate in the light source system based on data collected using a 50-mW laser source for various half-wave plate angles φ, wherein the plot shows substantial deviation from the model predictions of the contrast as a function of half-wave plate angle φ due to back reflections, with the dashed lines showing the ideal or expected peak and valley intensities in the absence of back reflections.

FIG. 9 is a plot of the integrated intensity I(ϕ) (arbitrary units, a.u.) of example LSP images 248 versus the half-wave plate angle ϕ (degrees) of the half-wave plate 500 based on data collected using a 50-mW laser in the LSP system 200 at various half-wave plate rotation angles ϕ for an example CS substrate 10. The plot of FIG. 9 shows substantial deviation from the model predictions of the contrast as a function of half-wave plate angle ϕ, with the dashed lines showing the ideal or expected peak and valley (max, min) intensities in the absence of back reflections. Besides the intensity fluctuations due to the back reflections, the peaks and valleys in the plot do not line up with the corresponding ideal half-wave plate angles, which makes it difficult to accurately and reproducibly obtain the appropriate intensity level for LSP measurements of various glass types. In addition, the contrast pattern changes with the orientation of the light source 212, which makes repeatability across different LSP systems even more difficult to achieve.

Figure 10:
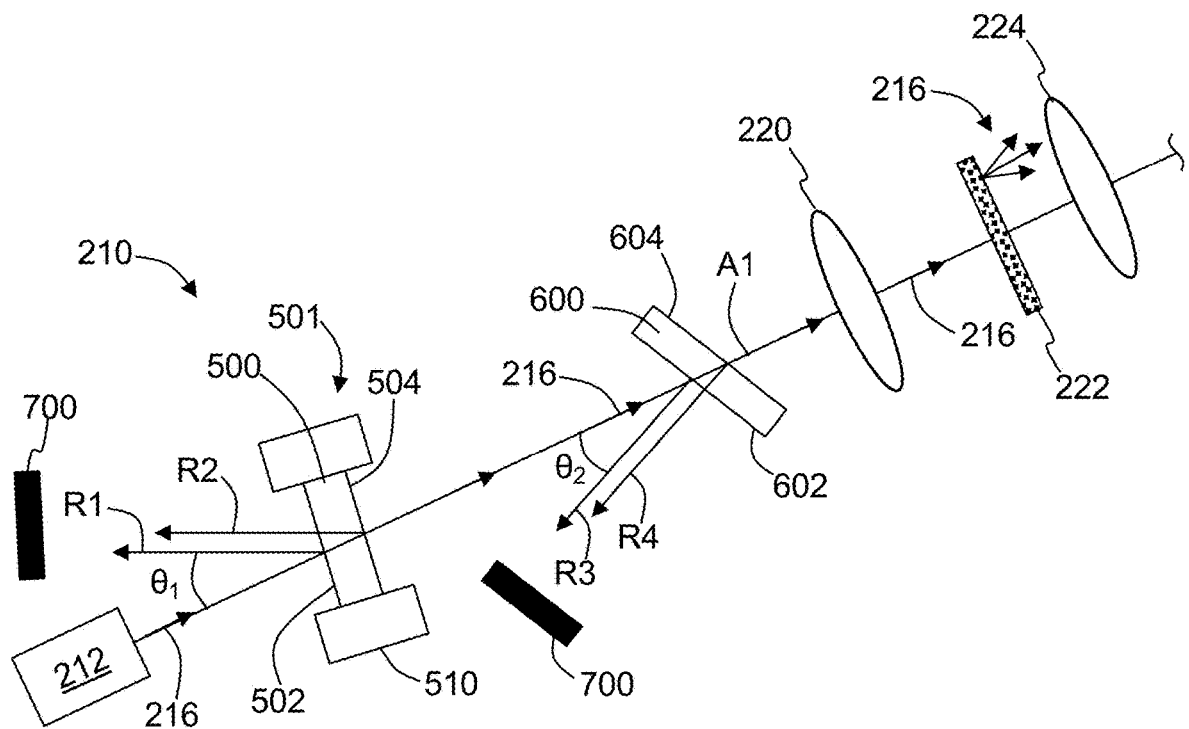
FIG. 10 is similar to FIG. 2A and illustrates an embodiment of the light source system wherein the rotatable half-wave plate and the polarizer are tilted relative to the axis A1.
Figure 11:
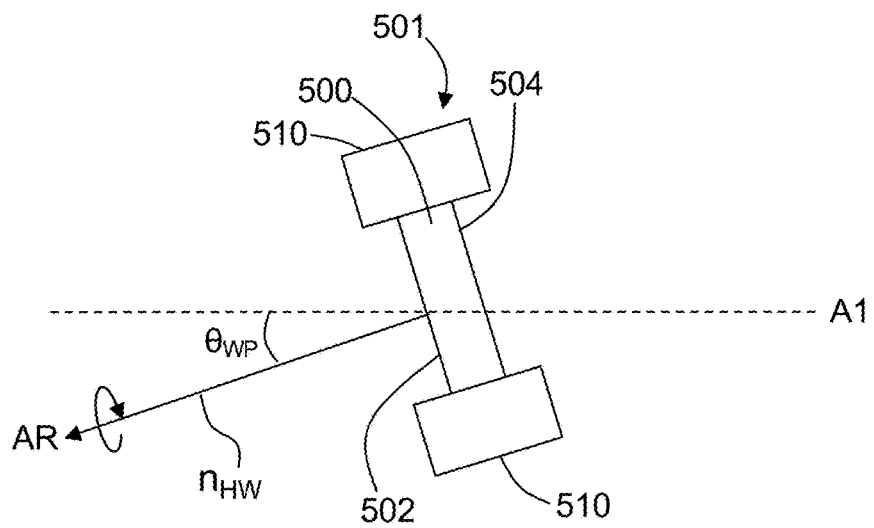
FIG. 11 is a close-up view of the tilted half-wave plate assembly of the light source system of FIG. 10.
Figure 12:
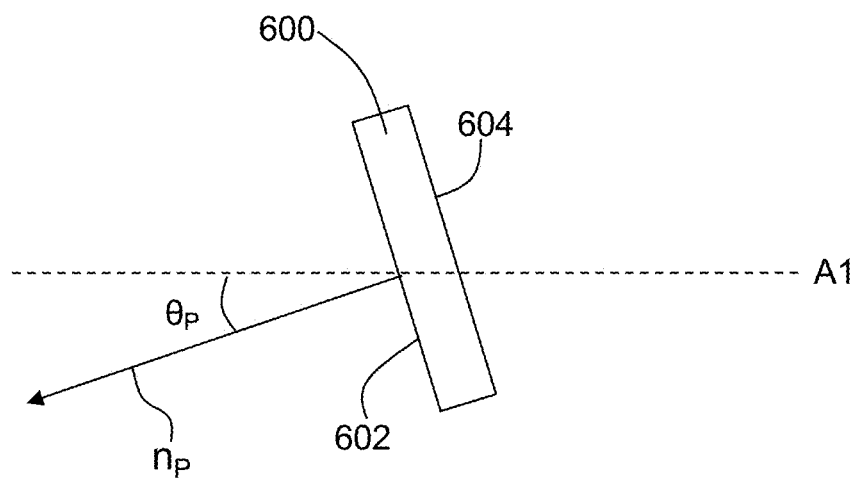
FIG. 12 is a close-up view of the tilted polarizer of the light source system of FIG. 10.

FIG. 10 is similar to FIG. 2A and illustrates an embodiment of the light source system 210 wherein the rotatable half-wave plate 500 and the polarizer 600 are tilted relative to the axis A1 by respective tilt angles $\theta_{WP}$ and $\theta_P$, as best seen in the close-up views of FIG. 11 and FIG. 12, respectively. The surface normals for the rotatable half-wave plate 500 and the polarizer 600 are denoted by $n_{HW}$ and $n_P$, respectively.

With reference to FIG. 10, the light beams 216 reflecting from the front and back surfaces 502 and 504 of the half-wave plate 500 (i.e., the back-reflected light beams) are denoted R1 and R2 and have reflection angles relative to the axis A1 of $\theta_1=2\theta_{WP}$. Likewise, the back-reflected light beams from the front and back surfaces 602 and 604 of the polarizer 600 are denoted R3 and R4 and have reflection angles relative to the axis A1 of $\theta_2=2\theta_P$. The tilt angles $\theta_{WP}$ and $\theta_P$ are selected so that the respective back-reflected light beams R1, R2 and R3, R4 do not enter the front end of the light source 212. Since the polarizer 600 is farther away from the light source 212, its tilt angle $\theta_P$ can be less than the half-wave plate tilt angle $\theta_{WP}$. Example tilt angles used for one example configuration of the light source system 210 were $\theta_{WP}=15°$ and $\theta_P=7.5°$. An example angular range for these tilt angles can be $10°\leq\theta_{WP}\leq20°$ and $5°\leq\theta_P\leq10°$, with the precise angle values being defined by the particular geometry of the light source system 210. In an example, light absorbers 700 can be used to intercept and absorb the reflected light beams R1 through R4 before they can reflect from a surface, such as the inside of a mounting tube (not shown) used to secure the various optical and mechanical components of the light source system 210.

Figure 13:
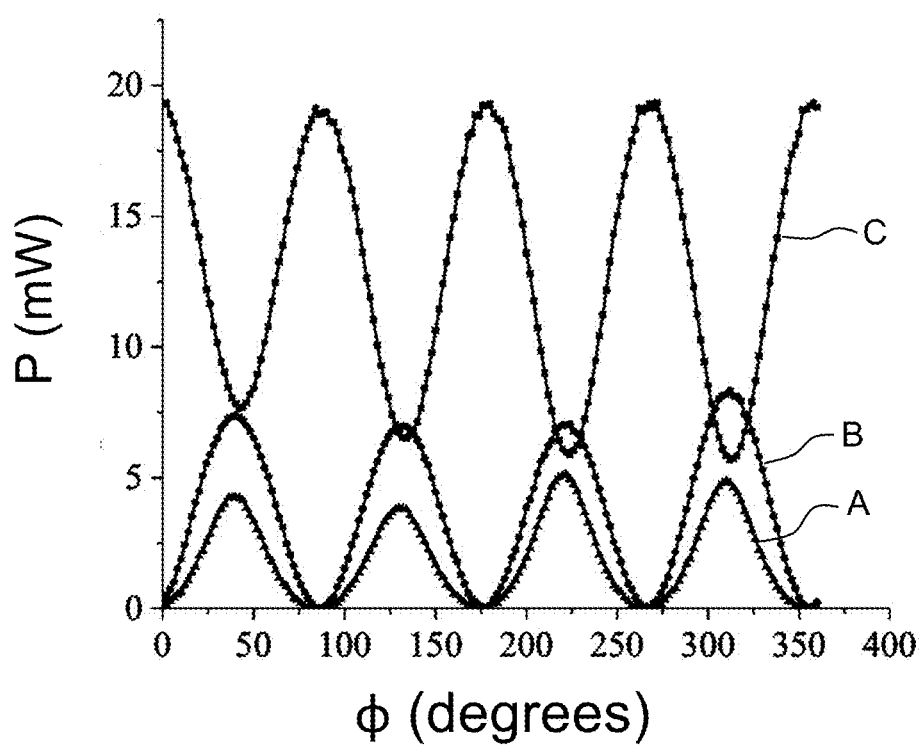
FIG. 13 is a plot of the output optical power P (milliwatts, mW) versus the half-wave plate angle φ (degrees) for configurations where neither the half-wave plate nor the polarizer are tilted (triangles, curve A), where just the half-wave plate is tilted (curve B) and where both are tilted (curve C).

FIG. 13 is a plot of the output optical power P (milliwatts, mW) versus the half-wave plate angle ϕ (degrees) for configurations where neither the half-wave plate 500 nor the polarizer 600 is tilted (triangles, curve A), where just the half-wave plate is tilted (curve B) and where both are tilted (curve C). The plot of FIG. 13 shows that the adverse effect on the outputted laser power of the reflected light 216 is the greatest when both the half-wave plate and polarizer are normal to the axis A1 (Curve A). As utilized herein, the "axis" generally refers to the optical axis in the direction that the light beam is traveling unless otherwise indicated. The output optical power P increased by about 50% when the half-wave plate 500 was arranged to have a tilt angle of $\theta_{WP}=15°$ and the polarizer 600 remains at its normal orientation (i.e., $\theta_P=0°$). This is illustrated by curve B, where the absolute maximum power measured P remains under 10 mW, which indicates that back-reflection from the polarizer 600 by itself adversely affects the overall laser intensity/power. The polarizer 600 was then given a tilt angle of $\theta_P=7.5°$ so that the back reflections R3 and R4 were directed away from the front end of the laser light source 212. A repeat of the measurement of the output optical power P with both the half-wave plate 500 and the polarizer 600 operably tilted relative to the axis A1 resulted in a large jump in maximum laser intensity to about 20 mW while the minimum achievable intensity remained above 5 mW, as shown in curve C. The half-wave plate also has a fast and slow axis, and the alignment of the fast and slow axis can produce a retardation effect when the half-wave plate is tilted, and the retardation effect may prevent the achievement of linear polarization. In an embodiment, the half-wave plate may be designed and configured such that the rotation axis is at 45° to the fast and slow axis, minimizing the change in retardation with tilt.

Figure 14:
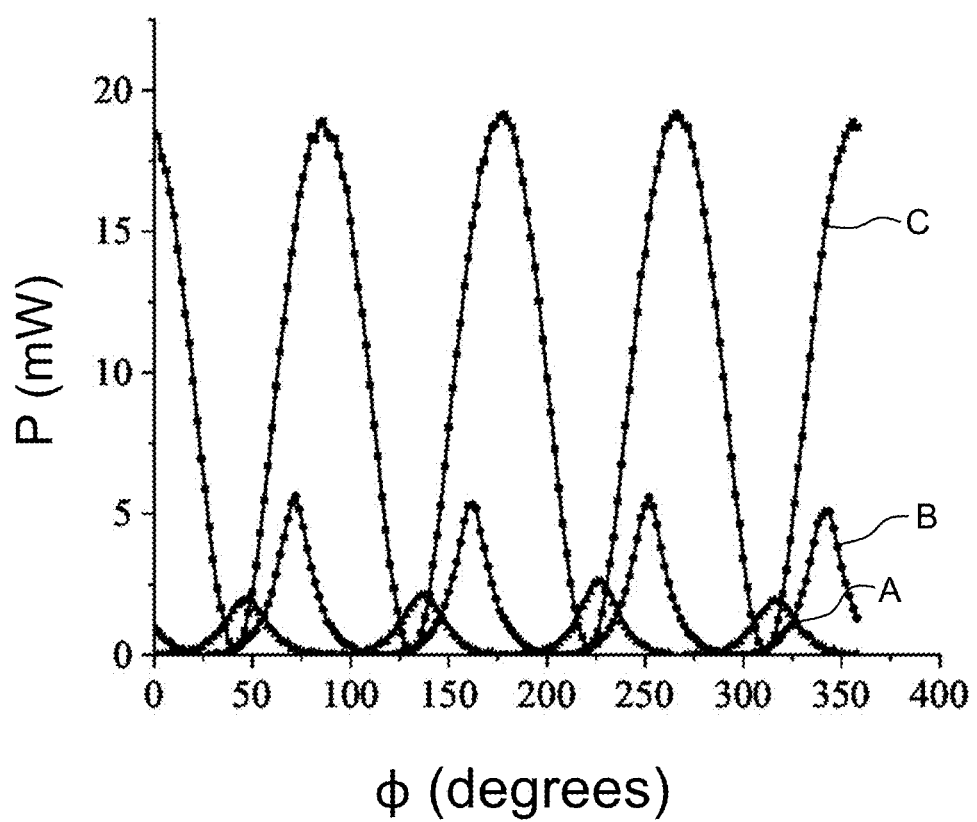
FIG. 14 is the same plot as in FIG. 13 but for a polymer-based half-wave plate rather than the quartz-based half-wave plate of FIG. 13.

The inability to achieve a minimum power/intensity value closer to zero mW in the plot of FIG. 13 is attributed to the sensitivity of the particular quartz half-wave plate 500 used in the experiments to the angle of incidence (AOI) of the incident light beam 216. According to data from the manufacturer's website, the amount of retardance achieved through a quartz half-wave plate is highly dependent on AOI and can reach close to 0.25 waves at $\theta w_P=15°$. Using a half-wave plate 500 of a less AOI-sensitive material such as a polymer provides much better results, as shown in FIG. 14, which used the same tilt configurations as FIG. 13 for curve C. Another option is to place the polarizer 600 upstream of the half-wave plate 500 so that a smaller AOI can be employed at the half-wave plate. This option can work in cases where the given polarizer 600 is less sensitive to AOI than the half-wave plate 500 and where switching the order of these components still provides overall net benefit. Another option is to place the half-wave plate sufficiently far from the light source 212 so that the required tilt angle $\theta w_P$ falls within the AOI tolerance of the half-wave plate.

Figure 15:
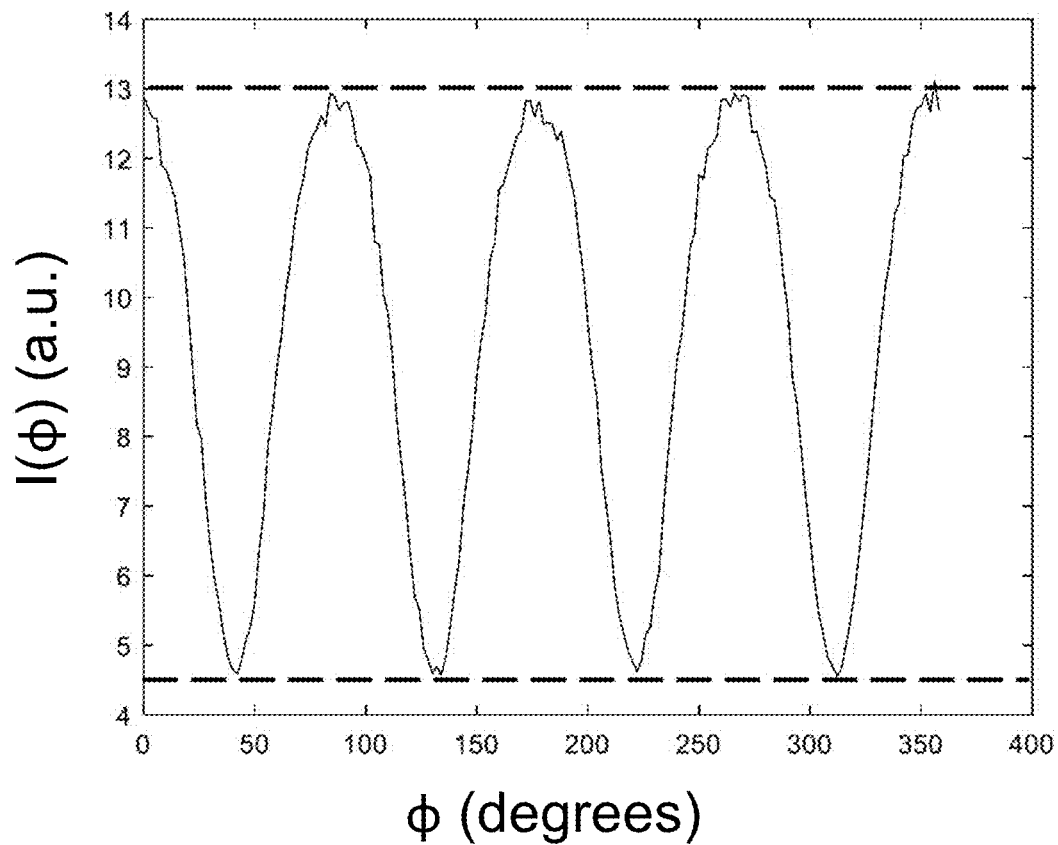
FIG. 15 is similar to FIG. 9 but where both the half-wave plate and the polarizer operably tilted in the light source system.

FIG. 15 is similar to FIG. 9 but now with both the half-wave plate 500 and the polarizer 600 operably tilted in the light source system 210 as described above. The measured intensity modulation pattern of FIG. 15 now closely matches the ideal (model) results. The orientation of the laser light source 212 does not influence the range of achievable intensities and in an example can be set to optimize the focus spot size on the CS sample 10 as seen by the digital detector 246 in the LSP system 200.

Thus, once the half-wave plate angle ϕ of the half-wave plate 500 is set to provide an optimum intensity of the light beam 216 for the given stress measurement and the orientation of the polarizer (polarization direction) is set to match that of the polarizer 232 of the optical compensator 230, the half-wave plate 500 and the polarizer 600 can then be tilted to their respective tilt angles $\theta_{WP}$ and $\theta_P$ selected to reduce the adverse effects of back reflections.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated. For the purpose of clarity and a concise description features are described herein as part of the same or separate embodiments, however, it will be appreciated that the scope of the invention may include embodiments having combinations of all or some of the features described.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated by reference.

What is claimed is:

1. A method of performing a stress measurement of a chemically strengthened glass using a light-scattering polarimetry (LSP) system having a light source system that emits a light beam, an optical compensator and a digital detector with an integration time $t_I$, comprising:
   a) adjusting the intensity of a light beam using a rotatable half-wave plate and a first polarizer operably disposed between the light source and a rotating light diffuser that has a rotation time $t_R$ by aligning the first polarizer with a second polarizer in the optical compensator to have matching polarization directions by rotating the rotatable half-wave plate to a position where the exposure time $t_E$ falls within an exposure range $t_R \leq t_E$; and
   b) performing an exposure using the exposure time $t_E$ to obtain the stress measurement.

2. The method according to claim 1, wherein the chemically strengthened glass comprises a first chemically strengthened substrate having a first amount of light scattering and further comprising:
   replacing the first chemically strengthened substrate in the LSP system with a second chemically strengthened substrate having a second amount of light scattering that is different from the first amount of light scattering by at least a factor of 2×; and
   repeating acts a) and b) for the second chemically strengthened substrate.

3. The method according to claim 1, wherein said adjusting comprises measuring a contrast of an intensity distribution of an LSP image captured by the digital detector.

4. The method according to claim 1, wherein the exposure time $t_E$ is between 5 ms and 10 ms.

5. The method according to claim 1, wherein the light source system comprises an axis along which the light beam travels, wherein the rotatable half-wave plate and the polarizer form back-reflected light from the light beam, and further comprising operably tilting at least one of the rotatable half-wave plate and first polarizer relative to the axis to avoid directing the back-reflected light to the light source.

6. The method according to claim 1, wherein the rotatable half-wave plate has a tilt angle $\theta_{WP}$ in the range $10° \leq \theta_{WP} \leq 20°$ relative to the axis.

7. The method according to claim 1, wherein the polarizer has a tilt angle $\theta_P$ in the range $5° \leq \theta_P \leq 10°$ relative to the axis.

8. The method according to claim 1, further comprising rotating the rotatable half-wave plate with a motorized mount that operably supports the rotatable half-wave plate.

9. The method according to claim 8, wherein the rotating the rotatable half-wave plate is conducted with a controller configured to automatically operate the motorized mount.

10. The method according to claim 1, further comprising:
    forming a digital LSP image of the chemically strengthened glass on a digital detector having a saturation limit and comprising pixels having corresponding pixel intensities as defined by the digital LSP image; and
    wherein said adjusting of the intensity of the light beam comprises limiting the pixel intensities to be between 25% and 75% of the saturation limit.

11. An illumination system for providing light intensity control in a light scattering polarimetry (LSP) system for measuring stress in a chemically strengthened glass and in optical communication with an optical compensator and a digital detector with an integration time $t_I$ and comprising in order along an axis:
    a light source that emits a light beam along the axis at a first intensity;
    a rotatable half-wave plate;
    a first polarizer having first polarization direction aligned with a second polarization direction of a second polarizer in the optical compensator;
    a rotatable light diffuser that has a rotation time of $t_R$; and
    wherein the rotatable half-wave plate is set at a rotation angle such that the light beam exiting the first polarizer and incident upon the rotatable light diffuser has a second intensity less than the first intensity that causes the LSP system to have an exposure time $t_E$ for the CS glass that falls within an exposure range $t_R \leq t_E$ for measuring the stress in the CS glass.

12. The illumination system according to claim 11, wherein the rotatable half-wave plate and the polarizer form back-reflected light and wherein at least one of the rotatable half-wave plate and the polarizer is/are operably tilted relative to the axis to direct the back-reflected light to the light source.

13. The illumination system according to claim 11, wherein the rotatable half-wave plate has a tilt angle $\theta_{WP}$ in the range $10° \leq \theta_{WP} \leq 20°$ relative to the axis.

14. The illumination system according to claim 11, wherein the polarizer has a tilt angle $\theta_P$ in the range $5° \leq \theta_P \leq 10°$ relative to the axis.

15. The illumination system according to claim 11, wherein the exposure time $t_E$ is between 5 ms and 10 ms.

16. The illumination system according to claim 11, wherein the light source comprises a laser diode having an optical power in the range from between 20 and 300 milliwatts.

17. The illumination system according to claim 11, wherein the light diffuser comprises a holographic light diffuser.

18. The illumination system according to claim 11, wherein the second polarizer comprises a polarizing beam splitter.

19. The illumination system according to claim 11, further comprising a rotatable motor mount that rotatably supports the rotatable half-wave plate.

20. The illumination system according to claim 19, further comprising a controller configured to automatically operate the rotatable motor mount.

* * * * *